March 17, 1964     E. B. CONNERAT     3,125,354
CONNECTOR GUARD FOR SEMI-TRAILER CHASSIS
Filed Nov. 19, 1962     2 Sheets-Sheet 1
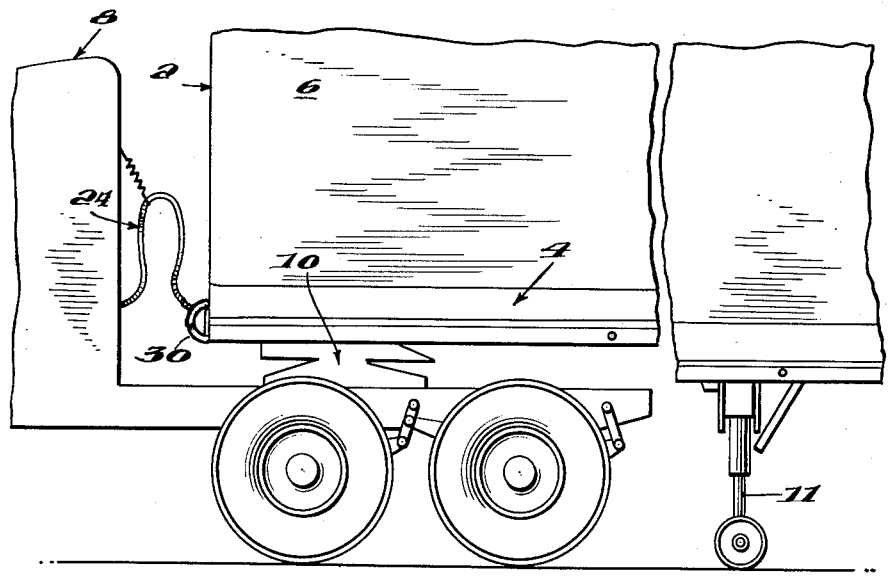
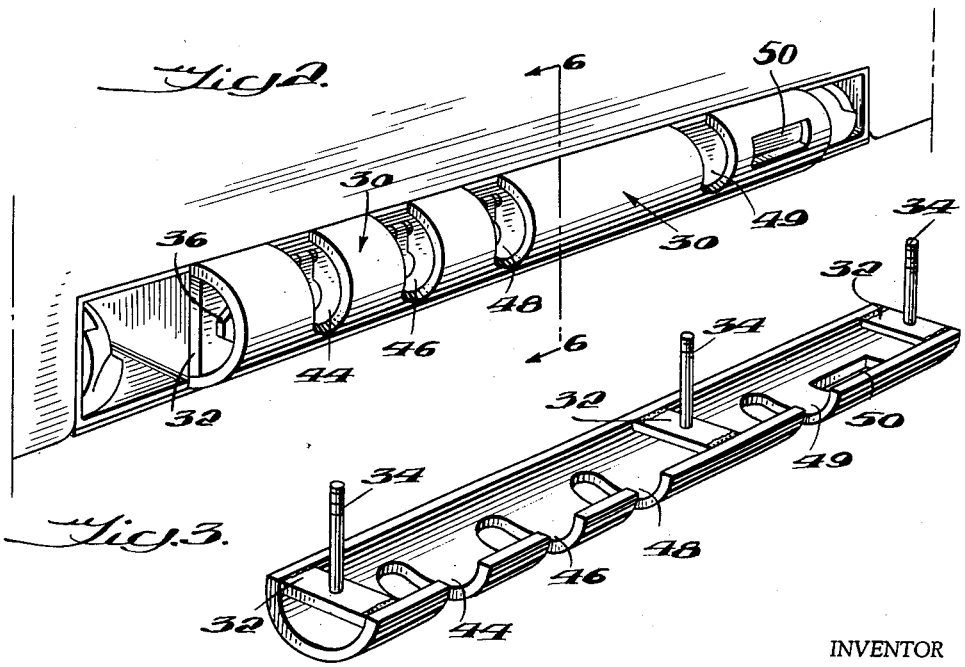
INVENTOR
Edwin B. Connerat
BY Scrivener and Parker
ATTORNEY March 17, 1964    E. B. CONNERAT    3,125,354
CONNECTOR GUARD FOR SEMI-TRAILER CHASSIS
Filed Nov. 19, 1962    2 Sheets-Sheet 2
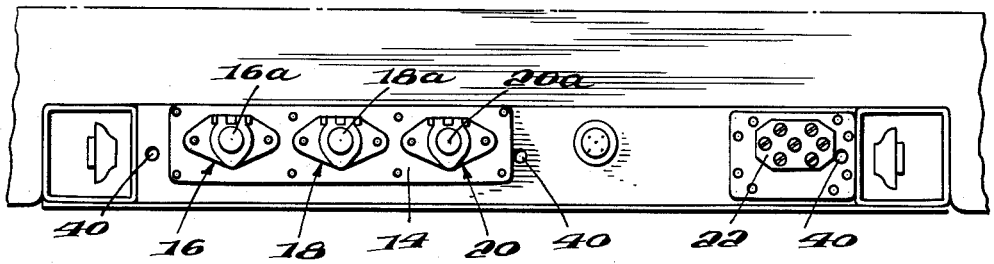
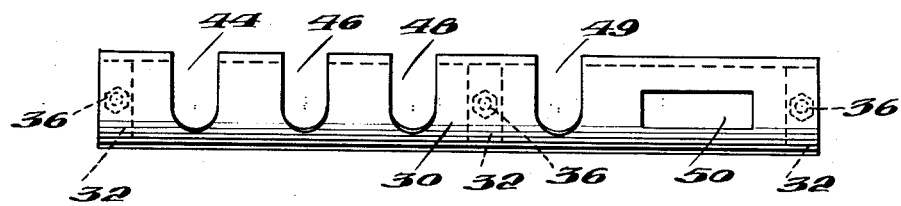
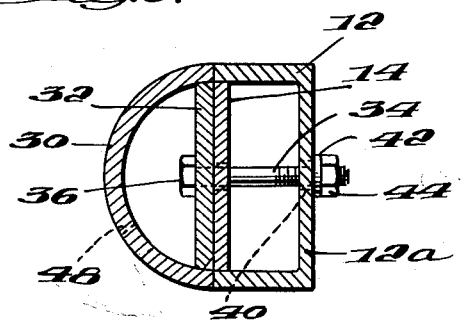
INVENTOR.
Edwin B. Connerat
BY Scrivener and Parker
ATTORNEY United States Patent Office 3,125,354
Patented Mar. 17, 1964

3,125,354
CONNECTOR GUARD FOR SEMI-TRAILER CHASSIS
Edwin B. Connerat, 49 Woodmont Road, Alexandria, Va.
Filed Nov. 19, 1962, Ser. No. 238,593
3 Claims. (Cl. 280—422)

This invention relates generally to connector guard means, and more particularly to a connector guard designed to protect the power service connector elements on the forward portion of a semi-trailer chassis frame against damage by the fifth wheel of an associated towing vehicle, during coupling operations.

It is conventional in the semi-trailer art to provide the electrical and pneumatic power service fittings and connector elements adjacent the forward end of the trailer chassis frame. By so locating the connectors, the lengths of the corresponding electrical cables and pneumatic hoses extending from the towing vehicle are reduced to a minimum, thus alleviating the danger of tangling and damaging of the leads between the truck and the trailer. The trailer king pin, which is adapted for connection with a fifth wheel at the rear of the tractor, is mounted on the lower surface of the chassis frame, van, or flat bed trailer rearwardly of the power connectors. One major drawback of this arrangement of parts is the frequent damage to the connectors caused by the fifth wheel during connection of the semi-trailer units, particularly when the tractor and trailer or container are on uneven, rough terrain.

One object of the present invention is to provide guard means which protect the connector elements against damage by the fifth wheel while also affording frontal access to the connector elements for the connection of the air or power supply hoses and cables thereto.

A more specific object of the invention is to provide a connector guard that is removably connected with the chassis frame forwardly of the connector elements, electrical and mechanical, said guard containing slots and openings affording frontal access to the connector elements, as desired.

A further object of the invention is to provide a connector guard having an arcuate cross-sectional configuration defining upper and lower horizontal edges adapted to abut the transverse channel or box section member of the chassis frame that carries the connector elements, said guard containing access openings opposite the respective connector elements, vertical plate means secured between the upper and lower horizontal edges of said guard, and bolt means connected with said plates for rigidly connecting said guard with said chassis frame.

A further object is to prevent incompetent persons from removing or tampering with the various electrical connections and to prevent other moving objects from damaging the front fixtures.

Other objects and advantages of the invention will become apparent from a study of the following specification when considered in conjunction with the accompanying drawing, in which:

FIG. 1 is a detailed side elevational view illustrating the location of the connector guard of the present invention on a semi-trailer;

FIG. 2 is a detailed front perspective view of the connector guard connected with the trailer chassis frame;

FIG. 3 is a rear perspective view of the connector guard;

FIG. 4 is a front elevational view of one of many combinations of the chassis frame with the connector guard removed;

FIG. 5 is a front elevational view of the connector guard; and

FIG. 6 is a detailed sectional view taken along line 6—6 of FIG. 2.

Referring now to the drawing, the trailer or, if desired, the container 2 includes a chassis frame 4, formed of welded longitudinal and transverse channel box and plate members, which supports body 6. As shown the trailer is pivotally connected with tractor 8 by conventional king pin and fifth wheel connecting means 10. Vertically adjustable supporting landing gear means 11 support the forward end of the trailer when the truck is disengaged therefrom. At its forward end, frame 4 includes a U-shaped transverse channel member 12 between the horizontal legs of which is welded a vertical wall member 14. If desired this member could comprise two channels welded together to form a box section, depending on the make of trailer. Mounted in openings in wall member 14 are connectors 16, 18 and 20. Connectors 16, 18 and 20 are electrical connectors of the multiple-contact male or female type. Connectors 16, 18 and 20 are connected with a trailer light wiring harness (not shown) that extends into channel member 12. These connectors are provided with vertical protective covers 16a, 18a and 20a that are hinged at their upper ends for upward, pivotal movement to substantially horizontal positions. A further multi-contact electrical connector 22 (FIG. 4) is mounted between the legs of channel member 12 remote from wall member 14. As shown in FIG. 1, flexible electrical conduits and air hose means 24 extend from the truck to the trailer and supply electrical power and pressurized air to the trailer via the above-described connectors.

In accordance with the present invention, a connector guard 30 is provided that protects connectors 16, 18, 20 and 22 against damage by the truck, or other devices, as it is engaged with and disengaged from the trailer. Guard 30, which is formed of heavy-duty pressed or rolled cast iron or steel having a thickness of the order of 0.375 inch, has an arcuate cross-sectional configuration as shown in FIG. 6. The vertical dimensions of guard 30 are such that its free longitudinal edges abut the free ends of the horizontal legs of channel member 12. As shown in FIG. 2, guard 30 extends substantially completely across the forward end of chassis frame 4, thereby protecting the air connections as well as electrical connections. Welded between the longitudinal edges of guard 30 are a plurality of spaced vertical plates 32. These plates contain through openings that receive the shank portions of horizontal bolts 34 having bolt heads 36. If desired, the bolts may be welded to the respective plates 32. Studs may be used. Furthermore, the plates may be reinforced, if desired, by rib means (not shown) that extend orthogonally from the plates into the space defined by the concave rear surface of guard 30.

As shown in FIGS. 4 and 6, the vertical wall 12a of transverse channel 12 is provided with through bores 40 adapted to receive the free ends of bolts 34. On the rear side of wall 12a washers 42 are mounted on bolts 34, and nuts 44 serve to tightly clamp guard 30 to channel member 12 forwardly of connectors 16, 18, 20 and 22, or elastic stop nuts only can be used. Vertical slots 44, 46 and 48 extend downwardly from the upper edge of guard 30 opposite connectors 16, 18 and 20, respectively, and are dimensioned to permit connector covers 16a, 18a and 20a to be pivoted upwardly to substantially horizontal positions. Access opening 50 is provided in connector guard 30 opposite connector 22.

Guard 30 is approximately two to three feet in length, four inches in height and has a transverse radius of curvature on the order of two inches.

Assume that the tractor 8 is to be connected with a trailer or trailer chassis 2 that is supported at its forward end by landing gear wheels 11. Connector guard 30 protects connectors 16, 18, 20 and 22 against damage by the fifth wheel of the tractor as it is backed toward the downwardly depending king pin on the chassis frame. After engagement of the king pin with the fifth wheel, the driver pivots covers 16a, 18a and 20a upwardly to substantially horizontal positions and makes the appropriate connections between the flexible cable and hose means (which extend from the tractor through slots to either 44, 46 and 48) and the respective connectors 16, 18 and 20. A further electrical cable is passed through opening 52 for connection with multi-contact connector 22.

Owing to its arcuate cross-sectional configuration, the guard is adapted to withstand appreciable impact forces in the rearward direction longitudinally of the trailer chassis frame. The vertical plates 32 welded between the horizontal edges of guard 30 further strengthen the guard and permit rigid connection of the guard to the chassis frame. Moreover, the abutting contact between the edges of the guard and the edges of the legs of channel member 12 further increases the resistance of the guard to impact forces.

Since the connector guard may be readily removed from the chassis frame by removal of nuts 44 from bolts 34, the replacement of a damaged guard, or the removal of a guard for free access to the connectors and their associated leads, may be accomplished in a simple manner without complicated or expensive auxiliary equipment. Although the guard permits frontal access for coupling of the cable and hose means 24 to the respective connectors, it prevents non-trained or unauthorized personnel from tinkering with the electrical lighting circuits provided on the trailer. Furthermore, when the connectors carried by cable and hose means 24 are coupled with the connector elements carried by channel member 12, all sets of connectors are protected against damage by extraneous objects during transport of the trailer.

While in accordance with the provision of the patent statutes, the preferred embodiment of the invention has been illustrated and described, it will be apparent to those skilled in the art that various modifications may be made in the apparatus described without deviating from the invention set forth in the following claims.

What is claimed is:

1. In combination with a semi-trailer including a trailer chassis frame provided at its forward end with a horizontal transverse channel member, a plurality of connector elements spaced horizontally along and connected with said channel member for supplying power for lights to load circuits associated with said trailer, some of said connector elements including hinged covers that are adapted to pivot upwardly to substantially horizontal positions, and king pin means secured to the under surface of said chassis frame rearwardly of said connector means, said king pin means being arranged for connection with the fifth wheel of auxiliary truck means; guard means for protecting said connector elements against damage by said fifth wheel during connection of said truck with said trailer, comprising a connector guard having an arcuate cross-sectional configuration and arranged adjacent and parallel with the forward surface of said channel member, said connector guard having a concave rear surface and horizontal upper and lower edges in abutting engagement with said channel member, said guard containing a plurality of vertical slots that extend downwardly from its upper edge opposite, respectively, those connector elements which are provided with hinged covers, the slots being dimensioned to freely receive said covers when they are pivoted upwardly to said substantially horizontal positions, said guard also containing through openings opposite, and permitting frontal access to, the other connector elements, vertical plates arranged between and secured to the upper and lower edges of said connector guard, said plates being horizontally offset from said slots and openings, and bolt or stud means connected with said plates and extending rearwardly through corresponding openings in said channel member for rigidly connecting said connector guard with said chassis frame.

2. In combination with a semi-trailer including a trailer chassis frame provided at its forward end with a horizontal transverse body support member, a plurality of socket elements spaced horizontally along and connected with said support member, some of said socket elements including normally closed hinged covers that are adapted to pivot to substantially horizontal positions, and means secured to the chassis frame for connection with attaching means mounted on tractor means for the purpose of securing the tractor and semi-trailer, guard means for protecting said socket elements comprising a connector guard having an arcuate cross-sectional configuration and arranged adjacent and parallel with the forward surface of said support member, said connector guard having a concave rear surface and horizontal upper and lower edges in abutting engagement with said channel member, said guard containing a plurality of vertical slots that extend downwardly from its upper edge opposite, respectively, those socket elements which are provided with hinged covers, the slots being dimensioned to freely receive said covers when they are pivoted upwardly to said substantially horizontal positions, said guard also containing through openings opposite, and permitting frontal access to, the other socket elements, means for attaching the guard to the support member, and plug elements associated with said tractor adapted to be inserted in said socket elements after said guard member is affixed.

3. The combination as called for in claim 2 including in addition, vertical plates arranged between and secured to the upper and lower inner edges of said connector guard, said plates being horizontally offset from said slots and openings, and means connected to said plates and extending rearwardly through corresponding openings in said channel member for rigidly connecting said connector guard to said chassis frame.

References Cited in the file of this patent

UNITED STATES PATENTS

| | | |
|---|---|---|
| 2,415,602 | Monaco | Feb. 11, 1947 |
| 2,660,679 | Hunt | Nov. 24, 1953 |
| 2,722,665 | Sauder | Nov. 1, 1955 |
| 2,841,415 | Black | July 1, 1958 |
| 2,891,102 | Grimes | June 16, 1959 |